United States Patent
Tuo et al.

(10) Patent No.: US 10,290,045 B2
(45) Date of Patent: May 14, 2019

(54) SYSTEM AND METHOD FOR INDOOR NAVIGATION AND INFORMATION PUSH USING LED LIGHTING DEVICES

(71) Applicant: ZHEJIANG SHENGHUI LIGHTING CO., LTD, Jiaxing (CN)

(72) Inventors: Jiabin Tuo, Jiaxing (CN); Chaoqun Sun, Jiaxing (CN); Jinxiang Shen, Jiaxing (CN)

(73) Assignee: ZHEJIANG SHENGHUI LIGHTING CO., LTD., Jiaxing (CN)

( * ) Notice: Subject to any disclaimer, the term of this patent is extended or adjusted under 35 U.S.C. 154(b) by 186 days.

(21) Appl. No.: 14/421,252

(22) PCT Filed: Nov. 11, 2014

(86) PCT No.: PCT/CN2014/090812
§ 371 (c)(1),
(2) Date: Feb. 12, 2015

(87) PCT Pub. No.: WO2015/070743
PCT Pub. Date: May 21, 2015

(65) Prior Publication Data
US 2016/0035011 A1    Feb. 4, 2016

(30) Foreign Application Priority Data

Nov. 12, 2013    (CN) .......................... 2013 1 0562221

(51) Int. Cl.
*G06Q 30/02*    (2012.01)
*G06Q 30/06*    (2012.01)
(Continued)

(52) U.S. Cl.
CPC ..... *G06Q 30/0639* (2013.01); *G06Q 30/0267* (2013.01); *H04W 4/023* (2013.01); *H04W 4/04* (2013.01); *H04W 4/043* (2013.01); *H04W 4/80* (2018.02); *H05B 37/0272* (2013.01); *G06Q 30/0261* (2013.01); *H04L 2012/2841* (2013.01); *H04W 4/12* (2013.01); *H04W 84/12* (2013.01);
(Continued)

(58) Field of Classification Search
CPC ....................................... G06Q 30/0207–0277
USPC ............................................. 705/14.1–14.73
See application file for complete search history.

(56) References Cited

U.S. PATENT DOCUMENTS

| | | | |
|---|---|---|---|
| 7,912,971 B1 * | 3/2011 | Dunn | H04L 63/102 709/203 |
| 2010/0141153 A1 * | 6/2010 | Recker | H05B 33/0803 315/149 |

(Continued)

*Primary Examiner* — Sam Refai
(74) *Attorney, Agent, or Firm* — Anova Law Group, PLLC

(57) ABSTRACT

The present disclosure provides an indoor navigation and information push system and method using LED lighting devices. The indoor navigation and information push system includes three LED lighting devices, each with a built-in Wi-Fi module and an information storage and navigation server configured to wirelessly communicate with LED lighting devices, store and transmit promotion data and product information. The information storage and navigation server and the LED lighting devices form an indoor wireless network. The indoor navigation and information push system further includes a user terminal configured to wirelessly communicate with the LED lighting devices and sends service requests to or receives data from the LED lighting devices.

15 Claims, 4 Drawing Sheets

(51) Int. Cl.

| | |
|---|---|
| *H04W 4/80* | (2018.01) |
| *H04W 4/04* | (2009.01) |
| *H04W 4/02* | (2018.01) |
| *H05B 37/02* | (2006.01) |
| *H04W 4/12* | (2009.01) |
| *H04W 84/12* | (2009.01) |
| *H04L 12/28* | (2006.01) |
| *H05B 33/08* | (2006.01) |

(52) U.S. Cl.
CPC ...... *H05B 33/0845* (2013.01); *H05B 37/0227* (2013.01)

(56) References Cited

U.S. PATENT DOCUMENTS

| | | | |
|---|---|---|---|
| 2010/0195632 A1* | 8/2010 | Prabhu | H04W 36/32 370/338 |
| 2013/0166193 A1* | 6/2013 | Goldman | G01C 21/206 701/410 |
| 2013/0317944 A1* | 11/2013 | Huang | G01S 5/0252 705/26.61 |
| 2014/0085179 A1* | 3/2014 | Krig | G06F 3/147 345/156 |
| 2014/0266585 A1* | 9/2014 | Chao | G07C 9/00111 340/5.61 |
| 2015/0018011 A1* | 1/2015 | Mendelson | G01C 21/206 455/456.3 |
| 2015/0161715 A1* | 6/2015 | Rose | G06Q 30/0639 705/26.8 |

* cited by examiner

SYSTEM AND METHOD FOR INDOOR NAVIGATION AND INFORMATION PUSH USING LED LIGHTING DEVICES

CROSS-REFERENCES TO RELATED APPLICATIONS

This application claims the priority of Chinese Patent Application No. 201310562221.3 filed on Nov. 12, 2013, the entire contents of which is incorporated herein by reference.

FIELD OF THE DISCLOSURE

The present disclosure relates to the field of light emitting diode (LED) and indoor information push technologies and, more particularly, relates to an indoor navigation and information push system and a method for navigating an indoor space and sending push notifications using LED lighting devices.

BACKGROUND

LED technologies provide many advantages including high-energy efficiency, eco-friendliness, controllable lighting, durable quality, long lifespan, etc. To promote low carbon living and protect environment, LED technologies have been widely adopted in various lighting applications.

Along with the development and widespread of information technology, people receive more and more contents from various information resources. Currently, there are several common indoor (for example, exhibition centers, department stores, supermarkets, etc.) information push systems and methods. The first option is to save information of all exhibits/products to a guiding device (such as iPod, iPad, tablets and other specially designed devices). When a user wants to find out about a certain item, he/she needs to manually search for it by locating the exhibit/product section on a specific software and listen to the introduction through speakers or headphones. Comparing to distributing paper-based promotional materials, this method is environmentally friendly because it uses reusable devices, and the exhibits/ merchandise database could be regularly updated. However, there are some drawbacks with this method. For example, it may be inconvenient and time-consuming for the users to manually locate a specific item. It may be exepnsive to purchase and maintain these guiding devices and headphones. The guiding devices may need to be manually and individually updated, which may be a significant task. The exhibits/merchandise information database may take up large storage spaces in the guiding devices, which may require costly hardware upgrades.

The second option is to use guiding devices that store all exhibits/merchandise information together with a specially designed information push module for each exhibit/product. When a user is in the vicinity of a certain exhibit/product (within a specific range), its information push module will send a corresponding play command to the guiding device wirelessly via a Wi-Fi, blue tooth, infrared or RFID transmission. In this case, the users do not need to manually search for a specific item. Nonetheless, there are still some shortcomings. It may be expensive to purchase and maintain the guiding devices and headphones. It may also be expensive to provide every exhibit/product with a corresponding information push module. It may require the guiding device to be within certain distance of the exhibits/products to avoid interferences and false commands, which may lead to waste of floor space. The exhibits/merchandise information database may take up large storage spaces in the guiding devices, which may require costly hardware upgrades.

In addition, the above-mentioned information push methods do not have indoor positioning and navigation capabilities so the users might get lost in a large indoor space. As a result, the users may not be able to pinpoint the location for the information pushes.

The disclosed method and system are directed to solve one or more problems set forth above and other problems.

BRIEF SUMMARY OF THE DISCLOSURE

Embodiments consistent with the present disclosure provide an indoor navigation and information push system and method using LED lighting devices that are convenience to user, with accurate positioning and easier updating capabilities.

One aspect of the present disclosure provides an indoor navigation and information push system using LED lighting devices. The indoor navigation and information push system includes three LED lighting devices, each with a built-in Wi-Fi module and an information storage and navigation server configured to wirelessly communicate with LED lighting devices, store and transmit promotion data and product information. The information storage and navigation server and the LED lighting devices form an indoor wireless network. The indoor navigation and information push system further includes a user terminal configured to wirelessly communicate with the LED lighting devices and sends service request to or receives data from the LED lighting devices.

Another aspect of the present disclosure provides an indoor navigation and information push method using LED lighting devices. The method includes installing at least three LED lighting devices each with a built-in Wi-Fi module in an indoor space and forming an indoor wireless network using the LED lighting devices together with an information storage and navigation server. The method further includes storing, by the information storage and navigation server, locations of the LED lighting devices; connecting a user terminal to a network node with Wi-Fi signals when the user terminal moves within an effective range in the indoor space; and sending data about a product offered in the indoor space to the user terminal after locating it through the LED lighting devices.

Another aspect of the present disclosure provides an indoor navigation and information push method using LED lighting devices. The method includes installing at least two LED lighting devices each with a built-in Wi-Fi module and a wireless router unit in an indoor space and forming an indoor wireless network in the indoor space, by the LED lighting devices and the wireless router, together with an information storage and navigation server. The method further includes storing, by the information storage and navigation server, the locations of the LED lighting devices; connecting a user terminal to a network node of the indoor wireless network with Wi-Fi signals when the user terminal moves within an effective range in the indoor space; and sending data about a product offered in the indoor space to the user terminal after locating it through the LED lighting devices.

Embodiments consistent with the presented disclosure provide an indoor positioning, navigation, and information push system through LED lighting devices with built-in Wi-Fi modules in an indoor space. The system is convenient to use and cost-effective to install.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
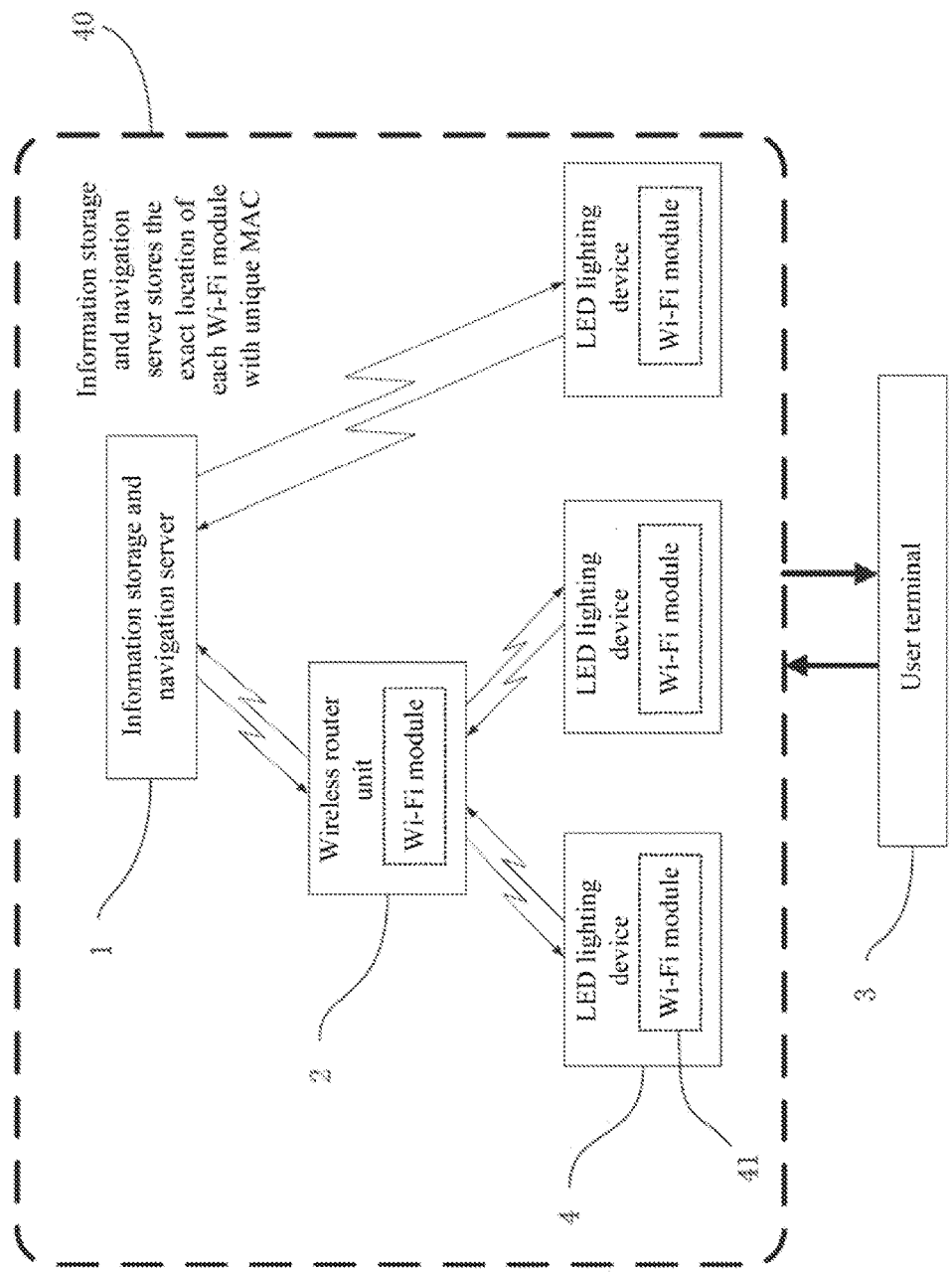
FIG. 1 is a block diagram illustrating an exemplary indoor navigation and information push system using LED lighting devices consistent with the present disclosure.

FIG. 1 shows a block diagram illustrating an exemplary indoor navigation and information push system using LED lighting device consistent with the present disclosure. As shown in FIG. 1, an indoor navigation and information push system using LED lighting device includes an information storage and navigation server 1, a wireless router unit 2, a user terminal 3, and at least two LED lighting devices 4 with built-in Wi-Fi modules 41. In embodiments consistent with the present disclosure, if the LED lighting device 4 has routing capacities, the wireless routing unit 2 is not necessary. However, in that case, there has to be at least three LED lighting devices 4 with built-in Wi-Fi modules 41 to implement indoor positioning and navigation functions.

The information storage and navigation server 1 provides location services. The information storage and navigation server 1 stores specific location information for each LED lighting device and each wireless routing unit under their unique media access control (MAC) addresses. The administrator uploads the building layout to calibrate and optimize the floor plan of network node location distribution. Unlike the outdoor location service providers (e.g., Google, Skyhook Wireless, Navizon, etc.), when a user terminal activates positioning and navigation services, the user terminal only needs to access the location data of the nodes from the information storage and navigation server.

Even if the indoor wireless network is not connected with internet (therefore cannot access the location data from outdoor location service providers), a user terminal can implement real-time positioning and navigation function by accessing the location data from the information storage and navigation server. Comparing to accessing outdoor location servers, localized information storage and navigation server provides services that are more secure, confidential, compatible and controllable. The quality of the positioning and navigation service may also be better. When a user terminal is connected to the indoor wireless network, the information storage and navigation server will deliver the corresponding floor plan to the user terminal according to its access permission level. For example, one user terminal may be allowed to access data related to products in group A; another user terminal may be allowed to access data related products in group A and group B.

Further, the information storage and navigation server 1 provides information storage services. It stores the information about exhibits/merchandise in exhibition centers, department stores and supermarkets, the floor plan of indoor exhibition areas/shopping areas, and the location of various service facilities, emergency exits locations, and promotional material about hot or sale items. When a user terminal connects to the indoor wireless network and requests service information, the information storage and navigation server will transmit relevant content to the user terminal through LED lighting devices according to its access permission level.

The wireless routing unit 2 may communicate with the information storage and navigation server either through fixed-wire ports or by Wi-Fi signals. An LED lighting device 4 may connect to the wireless routing unit 2 by its built-in Wi-Fi module. If it is in the effective wireless broadcast range of the information storage and navigation server, instead of connecting with the wireless router unit 2, the built-in Wi-Fi module of the LED lighting device may communicate with the information storage and navigation server directly.

The information storage and navigation server 1, the wireless router unit 2, and a plurality of LED lighting devices 4 may form an indoor wireless network 40. The wireless network 40 may broadcast with a unique service set identifier (SSID). That is, all indoor wireless devices may be directly controlled and connected for data transmission. A user terminal 3 may access the wireless network 40. When moving indoors within an effective range, the user terminal 3 will transmit related data or control command through a nearby LED lighting device 4 (e.g., with the strongest Wi-Fi signal).

Furthermore, in an indoor navigation and information push system consistent with the present disclosure, if the built-in Wi-Fi module 41 of an LED lighting device 4 has wireless routing capacities, the wireless communication between the LED lighting device 4 and a wireless router unit 2 is not necessary. That is, each LED lighting device 4 may act as a wireless access point; deliver the Wi-Fi signal from the information storage and navigation server to a next level, which may be the next cascading level of LED lighting devices 4. The cascading levels of network node (LED lighting device) connections expand the coverage range of Wi-Fi signals and connect all the nodes to the intranet or internet.

In addition, the information storage and navigation server 1 may provide indoor positioning and navigation services. The information storage and navigation server 1 stores the specific location of each LED lighting device 4 and each wireless routing unit 2 under their unique media access control (MAC) addresses. The server administrator may upload the building layout to further calibrate and optimize the network node location distribution.

If a user terminal 3 enters an exhibition center/department store for the first time, when connecting to the indoor wireless network 40 with a uniformed broadcast SSID, firstly, the user terminal 3 needs to download and install an application provided by the exhibition center/department store by following the prompts on its user interface. When user terminal 3 opens the application, the information storage server may actively send information about hot exhibits/products and promotions to the user terminal through cascading levels of network nodes. The application may provide a menu for exhibit/merchandise. When the user would like to know more about a specific exhibit/product, he/she may manually select the item in the user terminal application. The information storage server will then send relevant information to the user terminal with high speed Wi-Fi. When moving freely indoors within an effective range, the user terminal application automatically connects to a nearby network node with strongest Wi-Fi signal, while the node connecting and switching program runs in the background.

Further, while processing the service or data request from a user terminal 3, the information storage and navigation server 1 may determine the location and moving speed of the user terminal 3. After analyzing the current position of the user terminal 3, the information storage and navigation server 1 may push notifications to the user terminal 3 corresponding to information about neighboring hot items and sale items, floor plan of indoor exhibition areas/shopping areas, traffic information of every indoor exhibition areas/shopping areas, service status of nearby facilities (such as ticketing office, cashier, customer service, restroom, gift shop and indoor or outdoor parking lot), price comparison by product name or product bar code via the internet, etc.

A user does not have to download the application to a user terminal by accessing the indoor wireless network. As long as the user terminal has access to the internet, the application can be downloaded at a common application store (e.g., Google Play, 360 App Center, etc.) ahead of time without charge.

The time for information push may be when a user terminal 3 accesses the indoor wireless network 40, when the information storage and navigation server 1 finishes analyzing the current location of the user terminal 3, or when the user terminal 3 requests services. In addition, the information could be sent to registered users at scheduled times via the intranet or internet.

In the embodiments consistent with the present disclosure, a user terminal 3 may be a desktop computer, a laptop computer, a tablet, a smart phone, or a smart music player.

When a user terminal 3 enters and connects to the indoor wireless network 40 with unique SSID, the information storage and navigation server 1 may send information about hot/sale items through a wireless routing unit 2 or LED lighting devices 4 in the wireless network 40. More than one LED lighting devices 4 may be involved with the data transmission. In addition, if the user terminal 3 has the administrative access, it may control the working status of each LED lighting device 4 in the wireless network 40, such as switching lights on and off, adjusting the brightness, setting automatic on/off time, recording power usage, etc.

Figure 2:
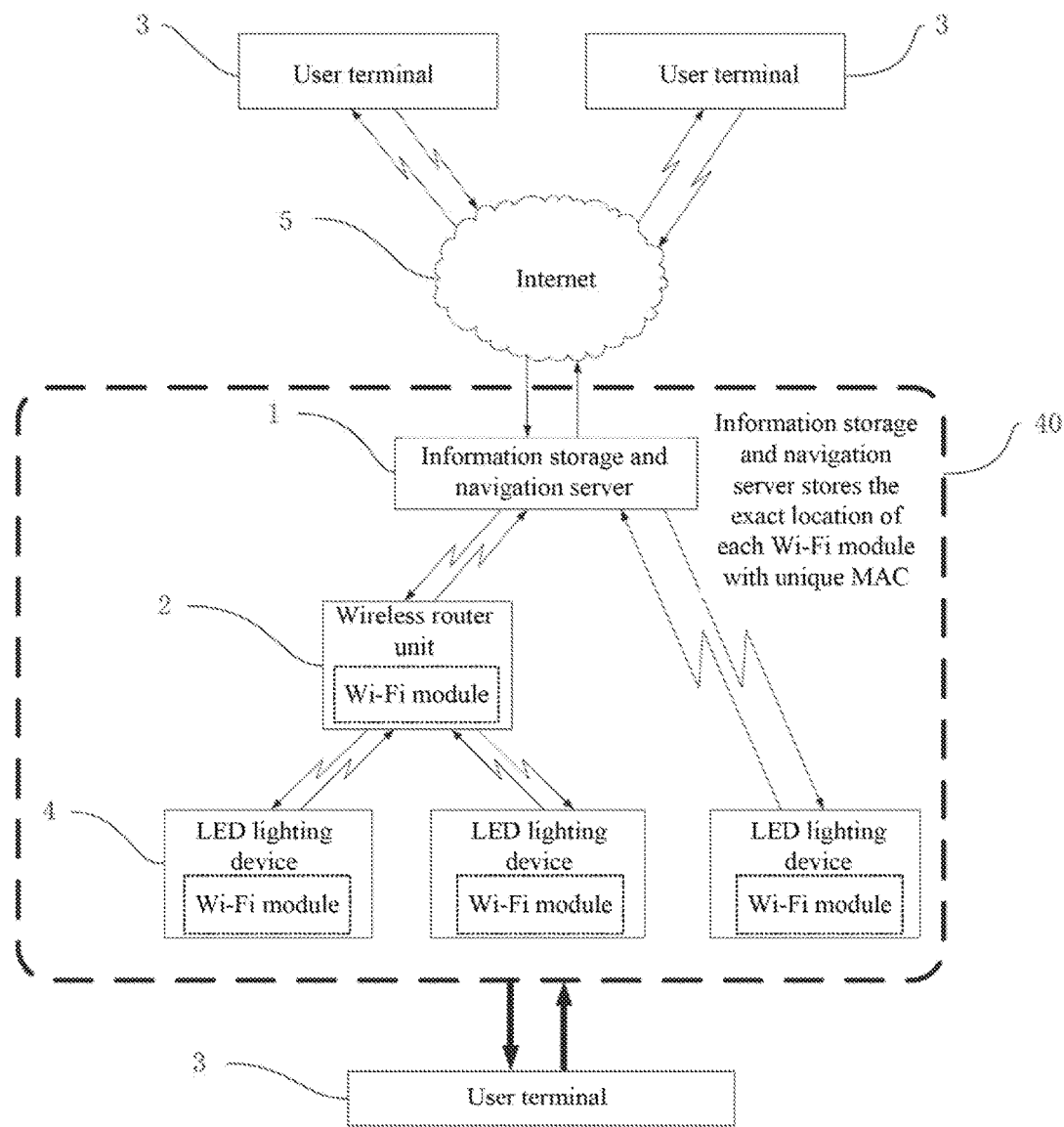
FIG. 2 is another block diagram illustrating an exemplary indoor navigation and information push system using LED lighting devices consistent with the present disclosure.

FIG. 2 is another block diagram illustrating an exemplary indoor navigation and information push system using LED lighting devices consistent with the present disclosure. As shown in FIG. 2, the information storage and navigation server 1 has a wired Ethernet port and a wireless Wi-Fi module for connecting with the internet. The server administrator may select either cable or wireless to connect to the internet 5, and therefore transmit data or commands to all indoor user terminals 3 indirectly.

Moreover, the information storage and navigation server 1 may connect to internet. The user terminal 3 may also connect to the internet by accessing indoor wireless network 40. While shopping and browsing, the users may surf the internet at high speed through evenly distributed LED lighting devices 4 with built-in Wi-Fi modules 41. The user terminal 3 may support price comparison functions with other stores and online shopping websites via the internet.

Figure 3:
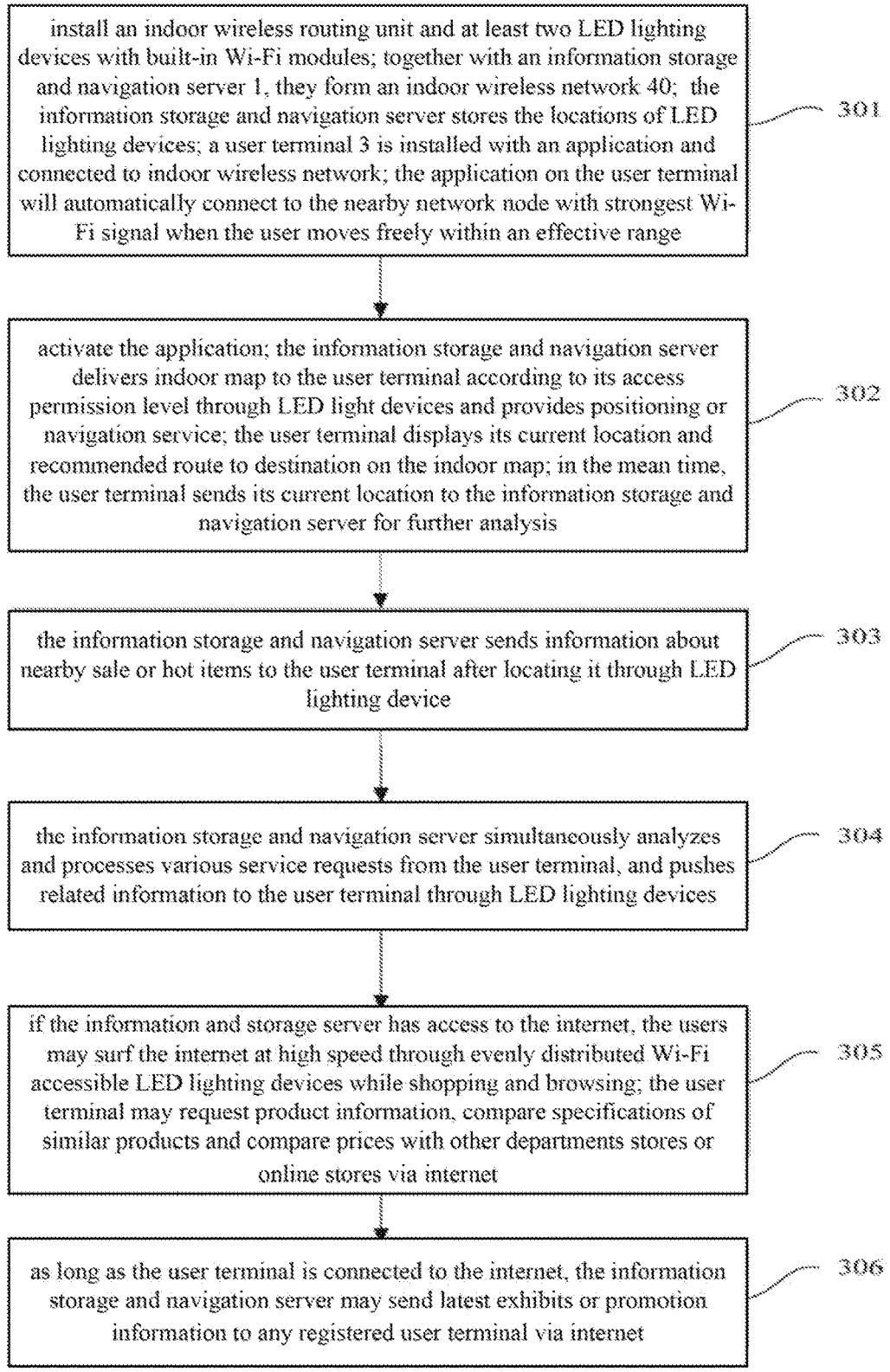
FIG. 3 is a flow chart diagram illustrating an exemplary indoor navigation and information push method using LED lighting devices consistent with the present disclosure.

FIG. 3 is a flow chart illustrating an exemplary indoor navigation and information push method using LED lighting devices consistent with the present disclosure. The method includes the following steps.

Step 301: install a wireless routing unit 2 indoors and at least two LED lighting devices 4 with built-in Wi-Fi modules 41. Together with an information storage and navigation server 1, the devices form an indoor wireless network 40. The information storage and navigation server 1 stores the location data of LED lighting devices 4. The user terminal 3 is installed with an application and is connected to indoor wireless network 40. The application on the user terminal automatically connects to a nearby network node with the strongest Wi-Fi signals when the user moves freely within an effective Wi-Fi range.

Step 302: activate the application. The information storage and navigation server 1 delivers indoor map to the user terminal 3 through cascading layers of LED lighting devices 4 according to its access permissions, and provides positioning or navigation services. The user terminal 3 displays its current location and a recommended route to a destination on the indoor map. In the meantime, the user terminal 3 sends the current location to the information storage and navigation server 1 for further analysis.

Step 303: the information storage and navigation server 1 sends information about nearby sale or hot items to the user terminal after locating it through LED lighting devices 4.

Step 304: the information storage and navigation server 1 simultaneously analyzes and processes various service requests from the user terminal 3, and pushes related information to the user terminal 3 through LED lighting devices 4.

Step 305: if the information and storage server 1 has access to the internet, the users may surf the internet at high speed through evenly distributed Wi-Fi accessible LED lighting devices 4 while shopping and browsing. The user terminal 3 may request product information, compare specifications of similar products, and compare prices with other department stores or online stores via the internet.

Step 306: as long as the user terminal 3 is connected to the internet (indoors or outdoors), the information storage and navigation server 1 can send the latest exhibits or promotion information to any registered user terminal 3 via the internet.

Figure 4:
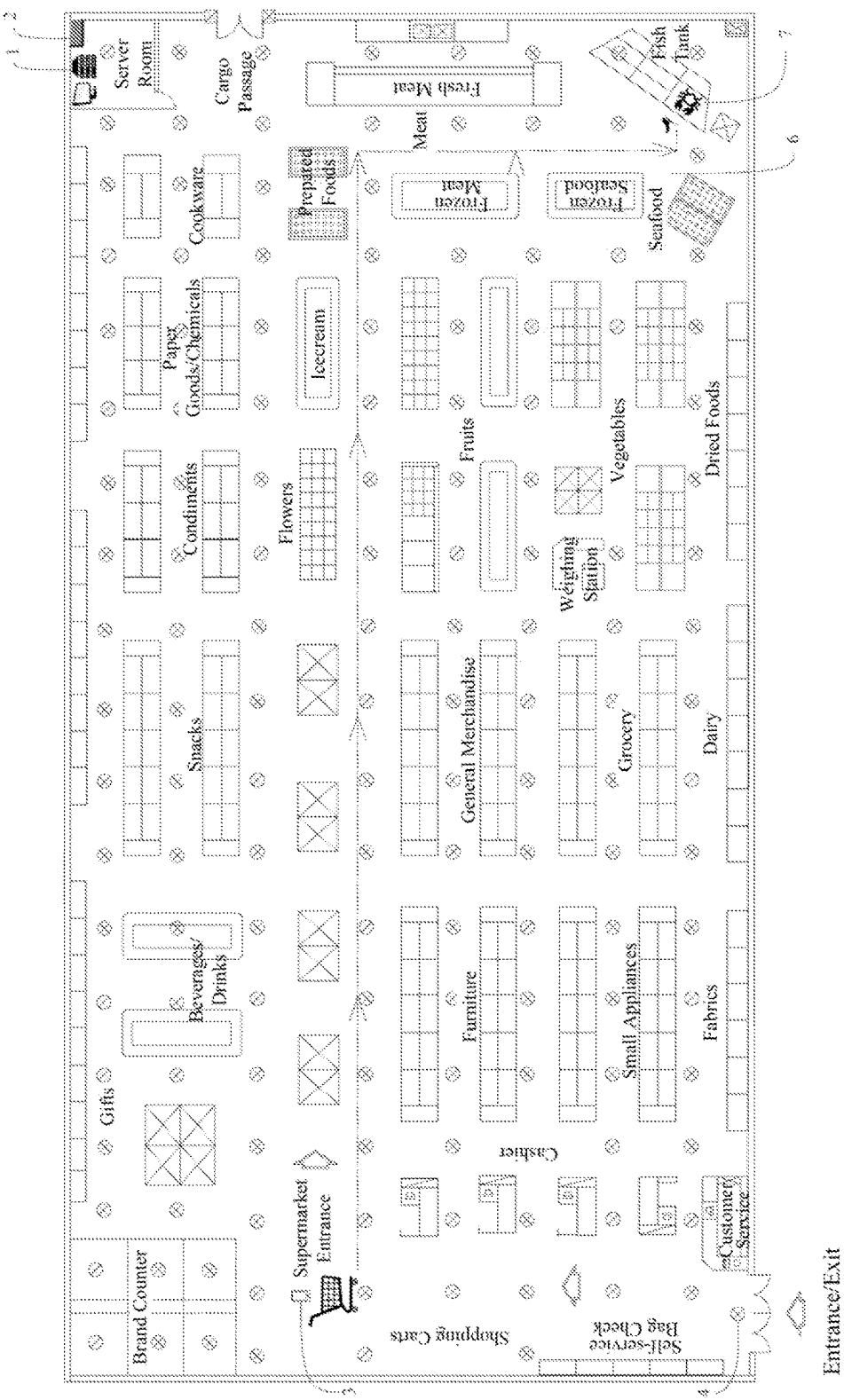
FIG. 4 is a schematic diagram illustrating an application of a supermarket indoor navigation and information push system using LED lighting devices consistent with the present disclosure.

FIG. 4 is a schematic diagram illustrating an application of a supermarket indoor navigation and information push system using LED lighting devices consistent with the present disclosure. As shown in FIG. 4, there are multiple LED lighting devices 4 with built-in Wi-Fi modules, a wireless router 2 and an information storage and navigation server 1. Together they form an indoor wireless network and broadcast with a unique SSID. When a user terminal 3 enters the supermarket and connects to the network with the unique SSID, as the user terminal 3 moves freely indoors within an effective range, the application on the user terminal 3 automatically connects to a nearby network node with the strongest Wi-Fi signals. The information storage and navigation server 1 determines the location and moving direction of the user terminal 3 in real time and pushes relevant information to the user terminal 3, such as the indoor floor plan of the current product section, promotional products, the traffic information in each product sections, the service status of nearby facilities (e.g., cashier, customer service, restroom, gift shop, indoor or outdoor parking lot), etc.

When a user needs a specific product, he/she only needs to tap the search button in the application and input the target product. The user terminal 3 displays an intuitive navigation route on the indoor map, for example, the route from "Entrance" to "Target product 7." In the meantime, to promote additional purchases, when the user is moving towards the target product, the information storage and navigation server 1 determines the location and moving direction in real time and pushes notification about relevant promotional products to the user terminal 3 along the way.

Further, when the user is looking for a specific category of merchandise, he/she only needs to tap the search button in the application and input the name of the category. The user terminal 3 will display an intuitive navigation route on the indoor map, for example, the route from "Entrance" to "Target product section 6."

If the information storage and navigation server 1 is connected to the internet, while shopping and browsing, a user may surf the internet at a high speed through evenly distributed, Wi-Fi accessible LED lighting devices. The user terminal 3 may scan the unique bar code of a certain product, search product specifications and compare prices with other stores and online shopping websites via the internet.

In embodiments consistent with the present disclosure, exhibition centers, department stores, or supermarkets may provide a two-dimensional code of the application installation package for users to download and install. They may also put the application in a common application store (such as: Google Play, 360 App Center, etc.) with no charge. Not only is it very convenient to update the software, the updating process is also cost-effective and eco-friendly (e.g., without printing paper copies of product promotions).

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The information push and navigation system and method using LED lighting devices consistent with the present disclosure does not require designated guiding devices. As smart phones and tablets become more and more popular, a user only need to install an application developed by a certain exhibition center, department store, or supermarket on a smart device. The navigation and information push functions are convenient and easy to understand. The exhibition center, department store, or supermarket saves expenses by not needing to purchasing, maintaining and updating specific guiding devices. In addition, the application does not limit users to stay at a specific indoor location to obtain relevant service information or send/receive control commands. As long as he/she can connect to the internet or the intranet, and have certain access permissions, the user can send or receive relevant information or control commands to the information storage and navigation server.

Further, the present disclosure provides indoor navigation and positioning capabilities that allow a user to locate a specific item, product category, or area quickly and accurately. The information storage and navigation server may also send nearby promotion information to user terminals according to their locations.

In one embodiment, when a user enters into an unknown building, by communications among LED lighting devices, the information storage and navigation server, and a smart terminal (e.g., a smart phone), a network map for the unknown building can be generated. Each node corresponds to an LED lighting device. Embodiments consistent with the present disclosure can thus accurately perform indoor positioning and navigation functions.

Embodiments consistent with the present disclosure may also be implemented in outdoor spaces, such as a public square or a sports arena. Embodiments consistent with the present disclosure may form a local network of LED lighting devices with Wi-Fi modules and an information storage and navigation server. A user terminal may connect to the local network. Embodiments consistent with the present disclosure may locate user terminals through the in-network LED lighting devices with Wi-Fi modules that are placed throughout the outdoor space. The information storage and navigation server may locate user terminals in the outdoor space, and provide navigation services to the user terminals through the LED lighting devices. The information storage and navigation server may also push data relevant to the user terminals through the LED lighting devices.

Moreover, the information storage and navigation server may collect and update the working status of other indoor/outdoor facilities. In department stores or supermarkets, such information includes guidance to specific product/product sections, shopping route suggestions and planning, promotion section route guidance and sale item introduction, traffic updates of each product sections, nearby service facilities and status inquiries (such as status of the cashier counter, bag check, gift shop, restroom), fire escape route guidance, etc. In exhibition centers, such information includes guidance to specific exhibit/exhibition area, tour route suggestions and planning, traffic information i of each exhibition area, nearby service facilities and status inquiries (such as a ticketing office, bag check, restroom, gift shop), fire escape route guidance, etc.

What is claimed is:

1. An indoor navigation and information push system using LED lighting devices, comprising:
   LED lighting devices, each with a built-in Wi-Fi module and an LED lamp configured to provide lighting to an indoor space, wherein a quantity of the LED lighting devices is at least three;
   an information storage and navigation server configured to: wirelessly communicate with the LED lighting devices, store physical locations of the LED lighting devices under unique media access control (MAC) addresses, obtain a floor plan of the indoor space, store and transmit promotion data and product information to the LED lighting devices; wherein the information storage and navigation server and the LED lighting devices form an indoor wireless network; and
   a user terminal configured to wirelessly communicate with the LED lighting devices in the indoor wireless network and to send a service request to or receive data from the LED lighting devices,
wherein the information storage and navigation server is further configured to:
deliver the floor plan to the user terminal through the LED lighting devices;
provide indoor positioning and navigation services to the user terminal according to the locations of the LED lighting devices;
receive a search request for searching a target product from the user terminal;
send a navigation route to the target product to the user terminal, wherein the user terminal is configured to display the navigation route on the floor plan;
when the user terminal is moving towards the target product, determine a location and a moving direction of the user terminal in real time, and push, to the user terminal, a notification about an item located along the moving direction of the user terminal; and
detect that the user terminal is moving towards the target product based on the navigation route; in response to detecting that the user terminal is moving towards the target product based on the navigation route, determine an access permission level of the user terminal, the permission level being a first access permission level or a second access permission level; provide the user terminal with access to a first data corresponding to products in a first group along the navigation route on the floor plan in response to determining that the user terminal has the first access permission level, and provide the user terminal with access to both the first data corresponding to the products in the first group and a second data corresponding to products in a second group along the navigation route on the floor plan in response to determining that the user terminal has the second access permission level.

2. The indoor navigation and information push system according to claim 1, wherein the information storage and navigation server sends information about a sale to the user terminal based on the location of the user terminal after locating the user terminal through the LED lighting devices.

3. The indoor navigation and information push system using the LED lighting devices according to claim 1, further comprising:
a wireless router unit with a built-in Wi-Fi module.

4. The indoor navigation and information push system using the LED lighting devices according to claim 3, wherein the wireless router unit, the information storage and navigation server, and the LED lighting devices form the indoor wireless network.

5. The indoor navigation and information push system using the LED lighting devices according to claim 1, wherein the information storage and navigation server is further configured to connect to the internet and provide remote access of the indoor wireless network to the user terminal through the internet.

6. The indoor navigation and information push system using the LED lighting devices according to claim 1, wherein the information storage and navigation server is further configured to connect to the internet and provide Internet access to the user terminal connected to the indoor wireless network through the LED lighting devices.

7. The indoor navigation and information push system using the LED lighting devices according to claim 6, wherein the information storage and navigation server is further configured to: when the user terminal accesses the internet, facilitate the user terminal to retrieve a price comparison from a store or an online shopping website.

8. The indoor navigation and information push system using the LED lighting devices according to claim 1, wherein the user terminal is a desktop computer, a laptop computer, a tablet, a smart phone, or a music player.

9. An indoor navigation and information push method using LED lighting devices, comprising:
forming an indoor wireless network using LED lighting devices together with an information storage and navigation server, wherein each of the LED lighting devices has a built-in Wi-Fi module in an indoor space, and each of the LED lighting devices includes an LED lamp configured to provide lighting to the indoor space, and a quantity of the LED lighting devices is at least three;
storing, by the information storage and navigation server, physical locations of the LED lighting devices under unique media access control (MAC) addresses;
obtaining, by the information storage and navigation server, a floor plan of the indoor space;
connecting a user terminal to a network node of the indoor wireless network with Wi-Fi signals when the user terminal moves within an effective range in the indoor space;
delivering the floor plan to the user terminal through the LED lighting devices;
providing indoor positioning and navigation services to the user terminal according to the locations of the LED lighting devices;
receiving a search request for searching a target product from the user terminal;
sending a navigation route to the target product to the user terminal to be displayed on the floor plan;
when the user terminal is moving towards the target product, determining a location and a moving direction of the user terminal in real time, and pushing, to the user terminal, a notification about an item located along the moving direction of the user terminal; and
detecting that the user terminal is moving towards the target product based on the navigation route; in response to detecting that the user terminal is moving towards the target product based on the navigation route, determining an access permission level of the user terminal, the permission level being a first access permission level or a second access permission level; providing, by the information storage and navigation server, the user terminal with access to a first data corresponding to products in a first group along the navigation route on the floor plan in response to determining that the user terminal has the first access permission level; and providing, by the information storage and navigation server, the user terminal with access to both the first data and a second data corresponding to products in a second group along the navigation route on the floor plan in response to determining that the user terminal has the second access permission level.

10. The indoor navigation and information push method using the LED lighting devices according to claim 9, further comprising:
connecting the information storage and navigation server to internet;
accessing the internet, by the user terminal, through the LED lighting devices and further through the information storage and navigation server, while the user terminal is in the indoor space; and receiving, by the user terminal, a price comparison with a store or an online shopping website.

11. The indoor navigation and information push method using the LED lighting devices according to claim 9, further comprising:
managing, by the user terminal, operation status of the LED lighting devices, including at least one of switching lights on and off, adjusting brightness, setting automatic on/off time, or obtaining a power usage record.

12. An indoor navigation and information push method using LED lighting devices, comprising:
forming an indoor wireless network in the indoor space, by LED lighting devices and a wireless router, together with an information storage and navigation server, wherein each of the LED lighting devices has a built-in Wi-Fi module in an indoor space, and each of the LED lighting devices includes an LED lamp configured to provide lighting to the indoor space, and a quantity of the LED lighting devices is at least two;
storing, by the information storage and navigation server, physical locations of the LED lighting devices under unique media access control (MAC) addresses;
obtaining, by the information storage and navigation server, a floor plan of the indoor space;
connecting a user terminal to a network node of the indoor wireless network with Wi-Fi signals when the user terminal moves within an effective range in the indoor space; and
delivering the floor plan to the user terminal through the wireless router and the LED lighting devices;
providing indoor positioning and navigation services to the user terminal according to the locations of the LED lighting devices;
receiving a search request for searching a target product from the user terminal;
sending a navigation route to the target product to the user terminal to be displayed on the floor plan;
when the user terminal is moving towards the target product, determining a location and a moving direction of the user terminal in real time, and pushing, to the user terminal, a notification about an item located along the moving direction of the user terminal; and
detecting that the user terminal is moving towards the target product based on the navigation route; in response to detecting that the user terminal is moving towards the target product based on the navigation route, determining an access permission level of the user terminal, the permission level being a first access permission level or a second access permission level; providing, by the information storage and navigation server, the user terminal with access to a first data corresponding to products in a first group along the navigation route on the floor plan in response to determining that the user terminal has the first access permission level; and providing, by the information storage and navigation server, the user terminal with access to both the first data and a second data corresponding to products in a second group along the navigation route on the floor plan in response to determining that the user terminal has the second access permission level.

13. The indoor navigation and information push system according to claim 1, wherein:
the LED lighting devices and the information storage and navigation server are network nodes of the indoor wireless network, a first network node being located within a Wi-Fi signal range of a second network node and configured to establish connection with the second network node; and
the promotion data and product information is transmitted to the user terminal through cascading levels of the first network node and the second network node.

14. The indoor navigation and information push system according to claim 13, wherein
the user terminal is further configured to automatically connect to a nearby LED lighting device with strongest Wi-Fi signals when the user terminal is moving freely within an effective coverage range of the indoor wireless network, the effective coverage range being established by connections of the network nodes based on Wi-Fi signal ranges of the network nodes.

15. The indoor navigation and information push method using the LED lighting devices according to claim 9, further comprising:
receiving a service request from the user terminal for requesting a service status of a cashier counter, or requesting traffic information of an area of the indoor space; and
according to the service request, providing requested information to the user terminal through the LED lighting devices.

* * * * *